July 27, 1926.  1,593,702
W. D. MOORE ET AL
ART OF PRODUCING CENTRIFUGAL CASTINGS WITH INNER AND OUTER
PROTECTIVE COATINGS
Filed August 7, 1923   2 Sheets-Sheet 1
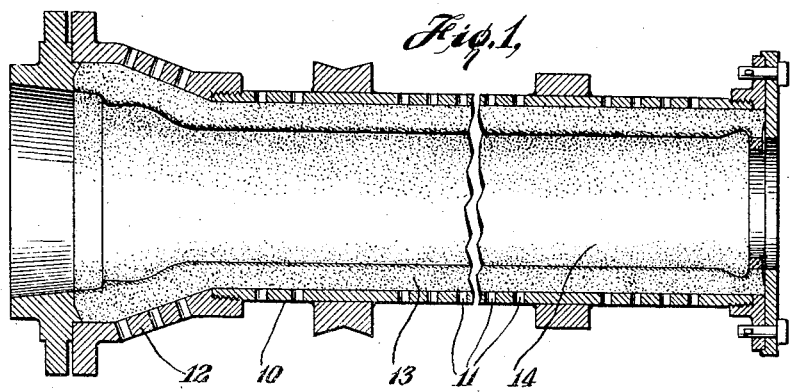
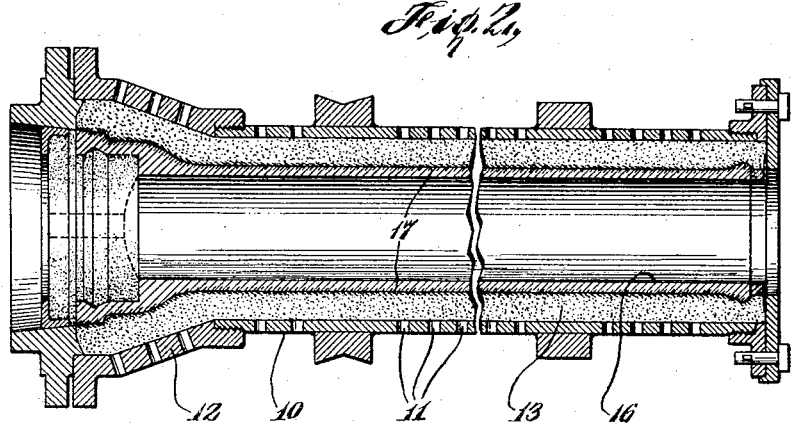
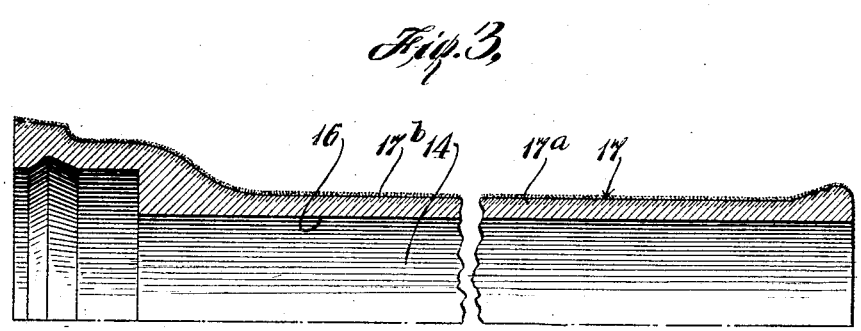
INVENTORS
WILLIAM D. MOORE
WALTER MORGAN
BY
Meyers & Cavanagh
ATTORNEYS

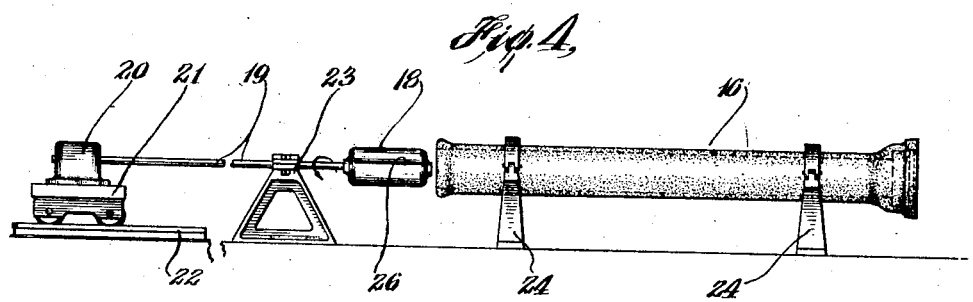
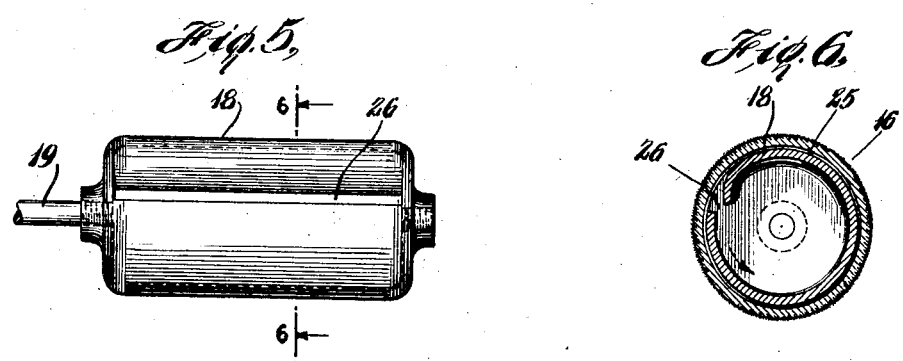
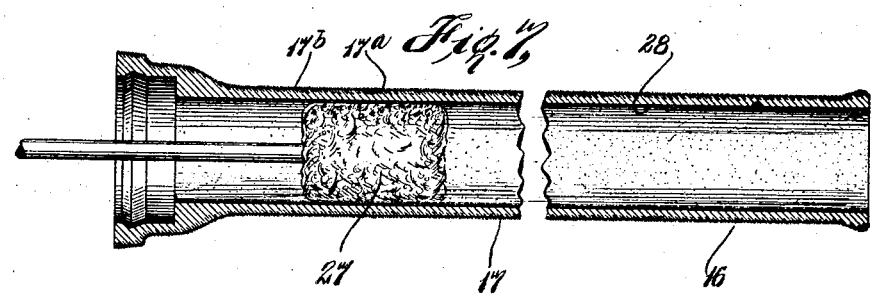
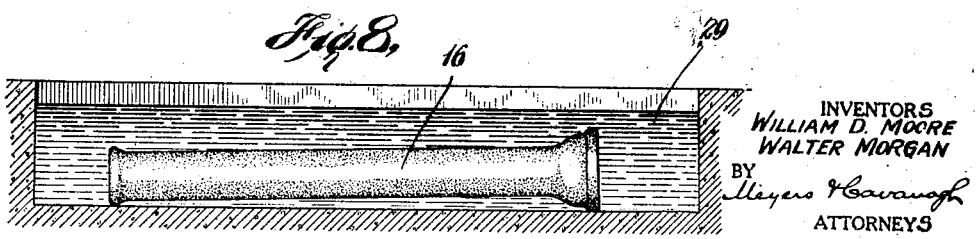

Patented July 27, 1926.

1,593,702

UNITED STATES PATENT OFFICE.

WILLIAM D. MOORE AND WALTER MORGAN, OF BIRMINGHAM, ALABAMA, ASSIGNORS, BY MESNE ASSIGNMENTS, TO SAND SPUN PATENTS CORPORATION, OF NEW YORK, N. Y., A CORPORATION OF DELAWARE.

ART OF PRODUCING CENTRIFUGAL CASTINGS WITH INNER AND OUTER PROTECTIVE COATINGS.

Application filed August 7, 1923. Serial No. 656,179.

This invention relates to the art of centrifugally casting hollow metal bodies such as metal pipe, and relates more particularly to the making of such metal pipe castings with inner and outer protective coatings; and has special reference to the production of double coated ferrous pipe castings.

It is well known that the formation of tubercles in cast iron pipe may be largely inhibited by the application to the interior walls of the pipe of protective linings such as cement linings which act both physically and chemically to exclude from the surface of the iron, media which produce and accelerate tuberculation. It has been demonstrated that cementitious linings are particularly efficacious in minimizing and eliminating tuberculation, this being not only because the cementitious lining acts as a physical barrier to the water and air in the line, but because the calcium hydroxide present in the cement acts as precipitant of any colloidal ferrous hydroxide that is initially produced by oxidation, and thus prevents the same from becoming oxidized to the higher hydroxide (ferric hydroxide), which latter would act as a catalytic agent in accelerating iron oxidation and tuberculation. The calcium hydroxide present in the cement lining has also a tendency to combine with the carbon dioxide contained in most waters to form a dense and nearly impervious precipitate of calcium carbonate which closes up the pores of the lining and further assists in excluding the oxygen from the surface of the iron. The production of ferrous castings in which tuberculation and corrosion are inhibited to a marked degree for an indefinite period of service, and in which both the outer and inner surfaces or walls of the casting are protected against corrosive attack, is a prime desideratum of my present invention.

As described and claimed in the copending application of William D. Moore to the art of producing centrifugal castings with a protective coating, Serial Number 623,649, filed March 8, 1923, of which this application is a continuation in part, there is produced centrifugally cast pipe with cementitious protective coatings intimately united with the outer walls of the castings, the coatings being fused to the pipe casting and produced during the casting operation, these integrally united coatings being capable of greatly resisting corrosive and other effects tending to shorten the life of the pipe. We have found that part of the coating produced by the casting operation described in the said application, and more particularly the coating part remotest from the casting skin, is obtained in a relatively unfixed state and may be removed, as by a violent rubbing action. In order to render the entire cementitious coating durable and highly resistant to wearing influences, and thus to obtain a maximum time protection against corrosive and other deleterious effects, we have discovered that the coated product of the invention may be subjected to a fixing treatment which hardens the entire coating and renders the same to all purposes an integral part of the pipe. The making of such an improved coated pipe product is another and co-relative object of the present invention.

In the making of inner lined castings, it is highly desirable to produce linings which are not only substantially impervious so as to effectively prevent tuberculation, but which are relatively thin so as not to materially diminish the capacity of the line, this being especially true for the smaller diametered pipe. Other desirable and advantageous characteristics are the production of a smooth lining surface having a low friction coefficient and a high hydraulic coefficient, and a lining surface which is greatly resistant to wear so as to maintain during use the low friction coefficient and prevent that roughening of the lining wall which gives such favorable opportunity to many forms of algæ to attach themselves and gradually diminish the area of the pipe. We have found that the inner cementitious protective lining may be made in a very thin layer, forming in effect merely a coating for the inside of a pipe, which coating may be subjected to a fixing and hardening treatment similar to and during the fixing treatment for the exterior coating, this fixed inner coating being characterized by its high degree of imperviousness, its low friction coefficient, durability and relatively small bodily thickness, and the production of inner coated pipe of this character is a further prime object of our present invention.

In making the double coated pipe product we first prepare a refractory mold by coating the same with a cementitious substance which forms a fusible mold facing, and then pour the molten metal into the mold. The facing after serving its purpose as a facing for the mold, fuses to the skin of the resulting casting and forms the cementitious coating therefor. The thus coated casting is removed from the mold and the interior of the casting is then coated with a thin layer of the cementitious substance which is thereafter dressed to effect a smooth coating surface. The double coated pipe is then submitted to the fixing treatment, and the inner and outer cementitious coatings hardened and rendered more impervious to produce the final marketable product. In the process thus carried out, the first or outer coating is produced during the casting of the pipe in a simple, efficacious and highly economical manner, and both of the coatings treated together with great convenience and economy to produce coatings which are fixedly attached and firmly united to the walls of the casting.

To the accomplishment of the foregoing and other objects as will become more evident as the description proceeds, our invention further consists in the double coated product, the processes and steps of obtaining the same, and the apparatus utilized in carrying out the process, all as sought to be defined in the appended claims, reference being had to the description and the accompanying drawings, in which:

Figure 1 is a cross-sectional view showing a rotary or centrifugally operated mold of the refractory type provided with a facing which forms the coating of our invention, Figure 2 is a cross-sectional view of the rotary mold after a casting operation and showing the facing on the surface of the casting functioning as a protective coating therefor, Figure 3 is a cross-sectional view of the casting removed from the mold and prior to the step of applying the inner coating thereto, Figure 4 is a view showing the apparatus employed for coating the inner wall of the casting, Figures 5 and 6 are detail fragmentary views of the coating apparatus, Figure 7 is a view showing the step of dressing the inner lining produced, and Figure 8 represents the step of subjecting the double coated pipe to the fixing treatment.

Referring now more in detail to the drawings, and more particularly to Figure 1 thereof, we show diagrammatically a mold comprising a flask 10 provided with a plurality of perforations 11 distributed over the body thereof, these perforations defining vent holes for the gases and steam generated during the casting step, and this mold may be provided with a bell end 12 where pipe having a bell mouth end is desired to be produced. This flask is first lined with a refractory lining 13 which in the preferred practice of the invention comprises the moist sand mixture described and claimed in the copending application of William D. Moore, Serial Number 623,650, filed March 8, 1923.

As hereinbefore stated, it is a desideratum of the present invention to produce centrifugally cast hollow bodies such as ferrous pipe having an outer protective coating which is readily and economically produced during the casting operation, the protective coating produced on the casting first forming a facing for the refractory mold and having very desirable properties and functions as a facing for the mold. To accomplish this, we employ a facing material which is applied to the surface of the moist sand mold in a powdered state, the powdered material having the properties of absorbing moisture from the sand lining 13, of taking a quick initial set to produce a tough membranous or skin-like mold facing which is highly refractory, of having a low capacity for absorption of heat, of producing a mold which is impervious to the molten metal, and of being of a fusible nature so as to readily unite with the skin of the casting to produce the desired protective coating therefor. It has been discovered that such a facing is produced with the use of natural cement, this being a pulverized product resulting from the calcination of an argillaceous limestone at a temperature only sufficient to drive off the carbon dioxide.

The powdered natural cement may be applied to the face of the moist sand mold in any manner, and is preferably so applied by means of the apparatus disclosed and claimed in the copending application of William D. Moore, Serial Number 587,999, filed September 13, 1922, for a mold facing device. Immediately the application is made, the powdered cement begins to absorb moisture from the moist sand lining 13 and chemically reacts to quickly take an initial set, producing instead of a soft powdered face a rather tough membranous or shell-like facing indicated as 14 in Figure 1, which has a high resistance to the cutting action of the iron, which has the property of taking a quick initial set without any application of heat, and which upon setting expands with the result that the facing tends to pack itself or imbed itself into the sand mold proper and in the grains of the sand on the face of the mold, so as to become at this stage of the process practically an integral part of the mold, the effect including a conditioning of the sand lining for the high resistance to destruction displayed thereby when molten metal is poured thereinto.

While in most instances we employ natural cement in its natural state, in some instances it is desirable to mix with the natural cement a small percentage, say from 5% to 10%, of an unctuous material such as graphite or talc, the purpose of this being to act as a lubricant to aid in the spreading of the cement on the face of the mold.

As heretofore indicated, the facing produced on the refractory lining possesses the property of being fused by the heat of the molten metal after the latter has been introduced into the mold and has distributed itself over the body thereof, the fusion of the cement to the metal causing the casting or pipe to retain a large portion of the same on the finished casting as a protective coating which displays great resistance to corrosion and which may be used to displace the ordinary tar or other coatings according to present practice.

Figure 2 of the drawings shows the refractory mold after a casting operation has taken place, and shows the hollow metal casting 16 provided with the outer coating 17 of the cementitious material. It has been empirically demonstrated that the fusing of the cement coating to the outer surface of the casting materially contributes to its power of resistance to corrosion. It may be noted that because of the highly non-conducting character of the cement facing on the sand lining, that the sand is prevented from attaining sufficient temperature during the casting operation to fuse with the cement so that the cement coated pipe easily cleaves from the mold. Although we prefer to employ the moist sand lining mixture above described with the natural cement facing for producing the coated casting, it will be understood that other sand lining mixtures may be used to yield satisfactory results.

As heretofore mentioned, part of the outer fused cementitious coating 17, and more particularly that part which may be described as the outer part, or that remotest from the skin of the casting, is in a relatively unfixed state, the coating produced in the casting operation comprising in effect two layers which for purposes of illustration are exaggerated in Figure 3 of the drawings and shown as 17$^a$ and 17$^b$ respectively, the one adjacent to and more intimately united with and the other more remote from the surface of the casting, the layer 17$^b$ being in a relatively unfixed state and being capable of removal if actively brushed or rubbed. To fix and harden this coating layer, the casting is given a fixing treatment. The improved process of the present invention contemplates subjecting the casting to a fixing treatment which is preferably carried out simultaneously with the fixing treatment of the inner coating, as will be described hereinafter.

After the casting operation and the removal of the casting from the mold, the inner cementitious coating is produced. As already indicated, it is an object of the present invention to produce relatively thin inner linings in the nature of coatings which will effectively withstand attack and prevent tuberculation and provide a durable and efficient protecting surface. Contradistinguished from the prior practice of producing relatively thick linings of say ¼ to ½ an inch for 6-inch pipe, our invention contemplates the application of a relatively thin coating, as for example a coating having a thickness of about $\frac{1}{16}$ of an inch, and preferably the further treatment of this coating to fix, render more impervious, and firmly attach the same to the pipe wall. By producing the thin coating, it will be evident that not only is the material reduction in the effective area of the pipe incident to the use of thick linings prevented, but that considerable economy in the use of materials is effected.

In producing the thin inner coating, we preferably provide a rotary container holding a supply of cementitious material, such as natural cement, Portland cement, Magnolia cement, or a combination thereof, sufficient water being added to bring the material to a semi-liquid or pasty consistency. The rotary container is then inserted into the pipe and rotated to discharge and distribute the cement in a thin coating over the wall of the pipe. The instrumentalities we prefer to employ for carrying out this process are shown in Figures 4 to 6 of the drawings, the apparatus comprising a cylindrical or drum-shaped container 18 shown in detail in Figures 5 and 6, the said drum-shaped container being fixed to a shaft 19 rotatable by means of a motor 20 mounted on a carriage 21 movable on rails 22, the said shaft being guided and supported by means of the support 23. The revoluble container 18 is movable into and out of the casting 16 which is held in stationary position by means of the supports 24 during the coating operation.

For producing the coating, the container is filled with the proper amount of the cementitious material, and the container is pushed into the end of the pipe and the motor started revolving in the direction as indicated by the arrows in Figures 4 and 6, and at the same time the whole machine is moved forward so that the container becomes a revolving distributor, the cement being delivered onto the wall of the pipe through the longitudinally arranged slot or feed opening 26, the outer wall of the container and distributor functioning to compact the cement onto the wall of the pipe. The original application of the cement to the wall of the pipe is preferably accomplished by one complete stroke or cycle, that is, moving the distributor through the pipe and returning the same. After this operation the cement is on the wall of the pipe in a very plastic state. If natural cement is employed, there is a very quick reaction, the cement taking a quick initial set and assuming a stiffer and more hardened condition resembling stiff putty, so that by the application of water in the pipe and the introduction of the distributor or of a swabbing device or brush 27 as shown in Figure 7 of the drawings, the cement is dressed, trowelled or slicked by revolving the dressing means and pushing it back and forth in the pipe until the cement has assumed a finished state resembling a very well trowelled cement sidewalk, but very much smoother, since in the preferred practice of the process we employ a neat cement, a smooth finished inner coating 28 being thus produced. We have discovered that if Portland cement is used, although it does not possess quick setting qualities, due to the fact that the coating obtained is very thin and approximately one-sixteenth of an inch, it is possible to uniformly distribute the Portland cement coating on the inside of the pipe and maintain the same in a stable condition. We have found that such a coating may be swabbed or brushed and due to the thinness thereof, there is little liability of the coating shifting or bagging, the cement containing sufficient moisture for the reaction which takes place in the final setting operation. Where natural cement is employed, we find that due to its property of expansion while setting, the coating attaches itself very firmly to the wall of the pipe. In either event it is found that the double coated pipe product as shown in Figure 7 is characterized by the outer and inner coatings 17 and 18 firmly united to the outer and inner walls of the pipe.

Although it is preferred to employ the apparatus shown in Figures 4 to 7 of the drawings for obtaining the very thin inner cementitious coating, it will be understood that the thin coating may be otherwise obtained, as for example by an application of dry cement to the inside of the pipe while the same is extremely hot immediately following the casting operation, this to produce a fusing of the cement to the inside of the pipe in a manner similar to the fusing of the cementitious coating onto the outside of the pipe.

After the coatings are thus produced, the coated pipe is subjected to the fixing treatment for hardening the coatings and for rendering the same more impervious. Where the inside coating is made of natural cement either fused to the wall of the pipe or applied thereto by means of the apparatus shown in Figures 4 to 7, both inner and outer coatings are subjected to the fixing treatment; and where, however, it is preferred to employ Portland or other cement for the inner coating, the fixing treatment for the latter may be dispensed with and the outer coating alone is treated. The fixing treatment is carried out by subjecting the coated pipe to a water bath to accomplish a reaction within the cement for obtaining the right degree of hardness. The water bath may be carried out by submerging the pipe under water for a number of hours, or it may be accomplished with equal facility by sprinkling the pipe periodically with water. In Figure 8 we show by way of illustration one manner of carrying out this treatment, the double coated pipe 16 being submerged in a water tank and kept in this submerged state for an extended period of time. It is equally preferred, however, to sprinkle the inner and outer coatings periodically, both producing the desired results. After this treatment the cement becomes fixed and hardened and more impervious, and to all purposes an integral part of the pipe, and cannot be removed as is the case before the water treatment.

While we have shown and described our device and method in the preferred form, it will be obvious that many changes and modifications may be made in the structure disclosed without departing from the spirit of the invention defined in the following claims.

We claim:

1. The method of making a metal casting with an outer protective coating united with the body thereof, which consists in providing the casting with a fused facing, and afterwards treating the facing to fix the same.

2. The method of making a metal casting with an outer protective coating united to the body thereof, which consists in providing the casting with a fused cementitious facing and afterwards treating the facing to fix the same.

3. The method of making a metal casting with an outer protective coating united to the body thereof which consists in providing the casting with a fused membranous cementitious facing and afterwards treating the facing to fix the same.

4. The method of making metal castings with an outer protective coating united to the body thereof, which consists in providing the casting with a fused facing of natural cement, and afterwards treating the facing to fix the same.

5. The method of making metal castings with an outer protective coating united to the body thereof, which consists in providing the casting with a fused facing of natural cement and a lubricant, and afterwards treating the facing to fix the same.

6. The method of making metal castings with an outer protective coating united to the body thereof, which consists in providing the casting with a fused facing of natural cement, and afterwards subjecting the casting to action of water to fix the coating thereon.

7. The method of making metal castings with an outer protective coating united to the body thereof, which consists in providing the casting with a fused facing of natural cement, and afterwards subjecting the casting to a water bath to fix the coating thereon.

8. The method of making metal castings with an outer protective coating united to the body thereof, which consists in providing the castings with a fused facing having a fixed inner and an unfixed outer layer, and afterwards treating the unfixed layer with water to fix the same.

9. In the art of making metal castings, the steps which consist in providing the casting during the making thereof with a coating united to a wall thereof, part of the coating in a fixed and part in an unfixed state and in treating the casting to fix the entire coating.

10. In the art of making metal castings, the steps which consist in providing the casting during the making thereof with a coating fused onto a wall thereof, part of the coating in a fixed and part in an unfixed state and in treating the casting to fix the entire coating.

11. In the art of making metal castings, the steps which consist in providing the casting during the making thereof with a coating united to a wall thereof, part of the coating in a fixed and part in an unfixed state and in subjecting the casting to the action of water to fix the entire coating thereon.

12. In the art of making metal castings, the steps which consist in providing the casting during the making thereof, with a coating fused onto a wall thereof, part of the coating in a fixed and part in an unfixed state and in subjecting the casting to the action of water to fix the entire coating thereon.

13. In the art of making centrifugally produced metal castings, the steps which consist in providing the casting during the making thereof with a coating united to the outer wall thereof, part of the coating in a fixed and part in an unfixed state and in treating the casting to fix the entire coating.

14. In the art of making centrifugally produced metal castings, the steps which consist in providing the casting during the making thereof with a coating united to the outer wall thereof, part of the coating in a fixed and part in an unfixed state and in subjecting the casting to a water bath to fix the entire coating.

15. In the art of making metal castings, the steps which consist in providing the casting during the making thereof with a coating united to a wall thereof, part of the coating in a fixed and part in an unfixed state and in subjecting the casting to a water bath for a substantial period of time to fix the entire coating.

16. In the art of making metal castings, the steps which consist in providing the casting during the making thereof with a cementitious coating united to a wall thereof, part of the coating in a fixed and part in an unfixed state and in treating the casting to fix the entire coating.

17. In the art of making centrifugally produced metal castings, the steps which consist in providing the casting during the making thereof with a coating composed of natural cement united to the outer wall thereof, part of the coating in a fixed and part in an unfixed state and in treating the casting to fix the entire coating.

18. In the art of making centrifugally produced metal castings, the steps which consist in providing the casting during the making thereof with a coating composed of a mixture of natural cement and an unctuous material united to the outer wall thereof, part of the coating in a fixed and part in an unfixed state, and in treating the casting to fix the entire coating.

19. The herein described steps in the method of making castings which consist in providing the casting with a cementitious coating and in treating the same to fix the coating.

20. The herein described steps in the method of making castings which consist in providing the casting with a cementitious coating and in subjecting the same to water treatment to fix the coating.

21. The herein described steps in the method of making castings which consist in providing the casting with a cementitious coating and in subjecting the same to the action of a water bath for an extended period of time to fix the coating.

22. The herein described steps in the method of making castings which consist in providing the casting with a coating composed of natural cement and in treating the same to fix the coating.

23. The herein described steps in the method of making castings which consist in providing the casting with a coating composed of a fused mixture of natural cement and an unctuous material and in treating the same to fix the coating.

24. The herein described steps in the method of making castings which consist in providing the casting with a coating composed of a fused mixture of natural cement and an unctuous material and in subjecting the same to the action of a water bath for an extended period of time to fix the coating.

25. The herein described steps in the method of centrifugally casting pipe which consist in providing the pipe during the casting thereof with a cementitious coating on the outer wall thereof and in treating the same to fix the coating.

26. The herein described steps in the method of centrifugally casting pipe which consists in providing the pipe during the casting thereof with a cementitious coating on the outer wall thereof and in subjecting the same to the action of a water bath for an extended period of time to fix the coating.

27. The method of producing coated pipe castings which consists in coating the interior of the pipe with a plastic substance having the property of expanding onto a wall of the pipe while setting, and in then treating the pipe to fix the coating.

28. The method of producing coated pipe castings which consists in coating the interior of the pipe with a plastic substance having the property of expanding onto a wall of the pipe while setting, and in subjecting the pipe to the action of water to fix the coating.

29. The method of producing coated pipe castings which consists in coating the interior of the pipe with a plastic substance having the property of expanding onto a wall of the pipe while setting, and in subjecting the pipe to a water bath for an extended period of time to fix the coating.

30. The method of producing coated pipe castings which consists in coating the interior of the pipe with a plastic substance having the property of taking a quick initial set, and in then treating the pipe to fix the coating.

31. The method of producing coated pipe castings which consists in coating the interior of the pipe with natural cement, and in then treating the pipe to fix the coating.

32. The method of producing coated pipe castings which consists in coating the interior of the pipe with natural cement, and in subjecting the pipe to a water bath to fix the coating.

33. The method of producing coated pipe castings which consists in coating the interior of the pipe with a substantially thin layer of natural cement, and in then treating the pipe to fix the coating.

34. The method of producing coated pipe castings which consists in coating the interior of the pipe with a layer of cement having a thickness of about one-sixteenth of an inch, and in then treating the pipe to fix the coating.

35. The method of producing coated pipe castings which consists in coating the interior of the pipe with a substantially thin layer of natural cement.

36. The method of producing coated pipe castings which consists in coating the interior of the pipe with a layer of natural cement having a thickness of about one-sixteenth of an inch.

37. The method of producing coated pipe castings which consists in coating the interior of the pipe with a cementitious material, in then treating the same with water and dressing the same, and in thereafter subjecting the pipe so treated to the action of a water bath for fixing the coating.

38. The method of producing coated pipe castings which consists in coating the interior of the pipe with a layer of natural cement, in treating the same with water and dressing the same, and in thereafter subjecting the pipe so treated to the action of a water bath to fix the coating.

39. The method of coating pipe castings which consists in introducing into the pipe a rotary container holding a supply of a plastic substance, and in rotating the container to discharge the substance and to distribute the same over the wall of the pipe to form the coating.

40. The method of coating pipe castings which consists in introducing into the pipe a rotary container holding a supply of a cementitious substance, and in rotating the container to discharge the substance and to distribute the same over the wall of the pipe to form the coating.

41. The method of coating pipe castings which consists in introducing into the pipe a rotary container holding a supply of natural neat cement, and in rotating the container to discharge the natural cement and to distribute the same over the wall of the pipe to form the coating.

42. The method of coating pipe castings which consists in introducing into the pipe a rotary and axially movable container holding a supply of a plastic substance, and in moving the container with a combined rotary and axial motion to discharge the substance and distribute the same over the wall of the pipe to form the coating.

43. The method of coating pipe castings which consists in introducing into the pipe a rotary cylindrical container holding a supply of a plastic substance, and in rotating the container to discharge the substance and to distribute the same over the wall of the pipe to form the coating.

44. The method of coating pipe castings which consists in introducing into the pipe a rotary container holding a supply of a plastic substance, in rotating the container to discharge the substance and to distribute the same over the wall of the pipe to form the coating, and in dressing the coating.

45. The method of coating pipe castings which consists in introducing into the pipe a rotary container holding a supply of a plastic substance, in rotating the container to discharge the substance and to distribute the same over the wall of the pipe to form the coating, in dressing the coating, and in thereafter treating the same with water to fix the coating.

46. The method of coating pipe castings which consists in introducing into the pipe a rotary container holding a supply of natural cement, in rotating the container to discharge the cement and to distribute the same over the wall of the pipe to form the coating, in dressing the coating, and in thereafter treating the same with water to fix the coating.

47. The method of coating pipe castings which consists in introducing into the pipe a rotary cylindrical container spaced from the wall of the pipe and holding a supply of a plastic substance, in rotating the container to discharge the substance and distribute the same over the wall of the pipe to form a substantially thin coating, in finishing the coating, the finishing including the steps of applying water to the same and slicking the same, and in thereafter subjecting the coated pipe so treated to a water bath for fixing the coating.

48. The method of making pipe castings with inner and outer protecting coatings, which consists in providing the castings with a fused outer facing, facing the inner face of the casting with a layer of plastic material and treating the castings to fix both facings.

49. The method of making pipe castings with inner and outer protecting coatings, which consists in providing the castings with a fused outer facing, facing the inner face of the casting with a layer of plastic material, and subjecting the casting to the action of water to fix the coatings.

50. The method of making a metal casting with inner and outer coatings, which consists in providing the casting with a fused outer facing of natural cement, coating the inner face of the casting with natural cement, and treating the casting to fix both coatings.

51. The method of making a metal casting with inner and outer coatings, which consists in providing the casting with a fused outer facing of natural cement, coating the inner face of the casting with natural cement, and subjecting the casting to a water treatment to fix both coatings.

52. In the art of coating hollow metal castings, the steps which consist in producing a casting having a coating united to the outer wall thereof, part of the coating being in a fixed and part in an unfixed state, in then coating the inner wall of the casting with a layer of a plastic substance, and in thereafter treating the casting to fix both the inner and outer coatings.

53. In the art of coating hollow metal castings, the steps which consist in producing a casting having a coating fused onto the outer wall thereof, part of the coating being in a fixed and part in an unfixed state, in then coating the inner wall of the casting with a layer of a plastic substance, and in thereafter treating the casting to fix both the inner and outer coatings.

54. In the art of coating hollow centrifugally cast metal bodies, the steps which consist in producing a centrifugally cast body having a coating fused to the outer wall thereof, part of the coating being in a fixed and part in an unfixed state, in then coating the inner wall of the body with the layer of cementitious substance, and in thereafter subjecting the body to a water bath for an extended period of time to fix both the inner and outer coatings.

55. In the art of coating centrifugally produced metal castings, the steps which consist in producing a hollow casting having a coating composed of a mixture of natural cement and an unctuous material united to the outer wall thereof, part of the coating being in a fixed and part in an unfixed state, in then coating the inner wall of the casting with a layer of natural cement, and in thereafter subjecting the casting to the action of water to fix both the inner and outer coatings.

56. The herein described steps which consist in producing a hollow casting having cementitious outer and inner coatings, and in treating the same to fix the said coatings.

57. The herein described steps which consist in producing a casting having inner and outer coatings composed of natural cement, and in treating the same to fix the coatings.

58. The herein described steps which consist in producing a casting having a cementitious coating fused to the outer wall of the casting and an inner coating composed of a thin layer of cementitious material, and in treating the casting to fix both the coatings.

59. The method of producing hollow castings having inner and outer protective coatings which consists in coating a mold with a substance forming a fusible facing, in pouring molten metal into the mold, the facing uniting with the outer wall of the resulting casting and forming a coating therefor, in then coating the interior of the pipe with a cementitious material, in thereafter treating the same with water and dressing the same, and in finally subjecting the pipe so treated to the action of a water bath for fixing both the inner and outer coatings.

60. The method of producing hollow castings having inner and outer protective coatings which consists in coating a mold with a substance forming a fusible facing, in pouring molten metal into the mold, the facing uniting with the outer wall of the resulting casting and forming a coating therefor, in then introducing into the casting a container holding a supply of a plastic substance, in rotating the container to discharge the substance and distribute the same over the inner wall of the casting to form the inner coating, and in thereafter treating the casting to fix both the outer and inner coatings.

61. A metal casting provided with a protective coating composed of a fixed and hardened cementitious substance.

62. A metal casting provided with a protective coating composed of a fixed and hardened natural cement.

63. A metal casting provided with a protective coating composed of a mixture of natural cement and an unctuous material treated to assume a fixed state.

64. A metal casting provided with a protective coating composed of a substance fused to a wall of the casting and treated to assume a fixed and hardened state.

65. A metal pipe provided with an outer protective coating composed of a fixed natural cement fused thereon.

66. A centrifugally cast pipe provided with a protective coating composed of a fixed cementitious substance fused to the body thereof.

67. A centrifugally cast pipe provided with a protective coating composed of a fixed substance fused to the body thereof.

68. A centrifugally cast pipe provided on its outer face with a protective coating composed of a cement and an unctuous material fused to the body of the casting and treated to assume a fixed state.

69. A hollow metal casting provided with a protective interior coating composed of a fixed and hardened cementitious substance.

70. A hollow metal casting provided with a protective interior coating composed of fixed and hardened natural cement.

71. A hollow metal casting provided with a protective interior coating composed of natural cement treated to assume a fixed state.

72. A hollow metal casting provided with a substantially thin protective interior coating composed of a fixed and hardened cementitious substance.

73. A hollow metal casting provided with a substantially thin protective interior coating composed of a fixed and hardened neat cement.

74. A hollow metal casting provided with a protective interior coating having a thickness of about one-sixteenth of an inch composed of a fixed cementitious substance.

75. A hollow metal casting provided with inner and outer coatings composed of a fixed and hardened cementitious substance.

76. A hollow metal casting provided with inner and outer coatings composed of a fixed and hardened natural cement.

77. A hollow metal casting provided with inner and outer protective coatings, the outer coating being composed of a mixture of natural cement and an unctuous material, and the inner coating being composed of a layer of neat cement, both coatings being treated to assume a fixed state.

78. A hollow metal casting provided with protective inner and outer coatings, the outer coating being fused to the wall of the casting and the inner coating being composed of a substantially thin layer of a fixed plastic substance.

79. A centrifugally cast pipe provided with inner and outer protective coatings, the outer coating being fused to the body of the casting.

80. A centrifugally cast pipe provided with inner and outer protective coatings, the outer coating comprising a cementitious substance fused to the body of the casting and the inner coating comprising a layer of cementitious substance.

81. A centrifugally cast pipe having inner and outer protective coatings, the outer coating being composed of natural cement fused to the body of the casting, with the inner coating being composed of natural cement applied to the inner wall of the casting.

82. A hollow metal casting provided with outer and inner protective coatings composed of natural cement.

83. A hollow metal pipe provided with an outer protective coating composed of a fixed natural cement fused to the pipe, and with an inner protective coating composed of a fixed natural cement.

84. A hollow metal casting provided with inner and outer protective coatings, the outer coating being composed of a mixture of a natural cement and an unctuous material, and the inner coating being composed of a layer of neat cement.

85. The method of casting metal bodies with a protective coating, which comprises casting the body in a mold having a facing of material capable of fusing with the body to form the coating.

86. The method of casting metal bodies with a protective coating, which comprises casting the body in a green sand mold having a facing of material capable of uniting with constituents of the mold to form a refractory facing, and capable of fusing with the body to form the coating.

87. The method of casting metal bodies with a protective coating, which comprises casting the body in a mold having a facing of material capable of fusing with the body to form the coating.

88. The method of casting metal bodies with a protective coating, which comprises casting the body in a mold having a facing of material capable of uniting with constituents of the mold to form a refractory facing and capable of fusing with the body to form the protective coating.

89. The step in the method of making metal castings, which consists in providing the casting during the casting thereof with a coating united to a wall thereof.

Signed at Birmingham, in the county of Jefferson and State of Alabama, this 26th day of July, A. D. 1923.

WILLIAM D. MOORE.
WALTER MORGAN.